Aug. 10, 1937.　　　　R. SICA　　　　2,089,303
HOT WATER URN
Filed April 7, 1937
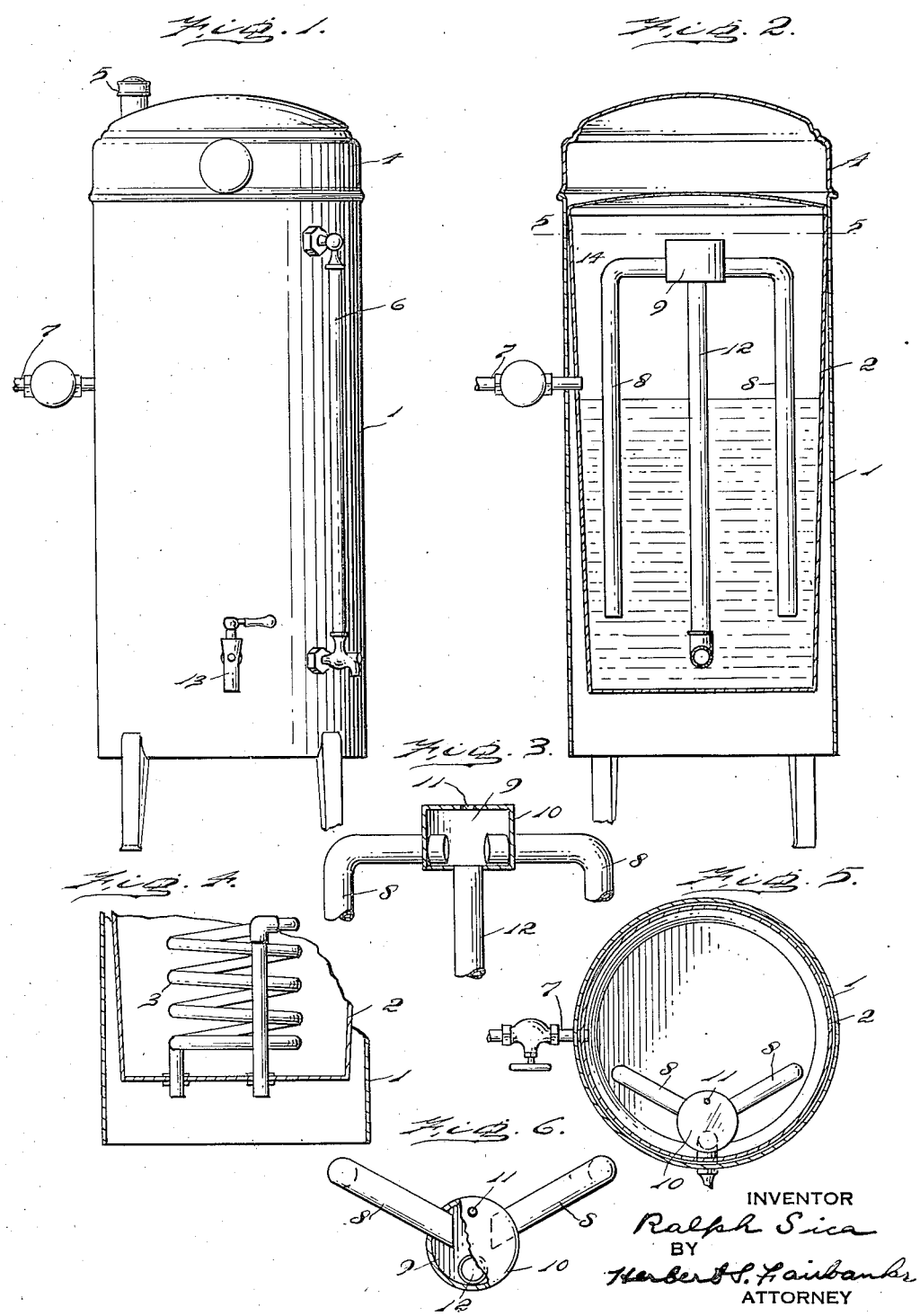
INVENTOR
Ralph Sica
BY
Herbert S. Fairbanks
ATTORNEY Patented Aug. 10, 1937

2,089,303

UNITED STATES PATENT OFFICE 2,089,303

HOT WATER URN

Ralph Sica, Philadelphia, Pa., assignor to Horn and Hardart Baking Company, Philadelphia, Pa., a corporation of New Jersey Application April 7, 1937, Serial No. 135,397

3 Claims. (Cl. 122—234)

In the art of making coffee in hotels and restaurants, it is customary to use a battery of urns consisting of a hot water urn and one or more coffee urns. When coffee is to be made it is placed in a coffee urn and the very hot, or boiling water is drawn from the hot water urn and poured into the coffee urn.

If the water in the hot water urn is not hot but cool or cold, it is possible in the prior art constructions for a careless attendant to draw water which is not heated to the proper degree from the hot water urn and if this is placed in a coffee urn, inferior coffee is produced.

The primary object of this invention is to so construct the hot water urn that an attendant can not withdraw water from it which is not heated to the proper degree for the making of coffee.

With the above and other objects in view, which will hereinafter clearly appear, my invention comprehends a novel hot water urn.

It further comprehends a novel hot water urn, wherein the withdrawal of water from it is controlled by a novel construction and arrangement of a siphon provided with vacuum breaking means which prevents the operation of the siphon if the water is not heated to the proper degree for the making of satisfactory coffee.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a front elevation of a hot water urn embodying my invention.

Figure 2 is a sectional elevation.

Figure 3 is a detail on an enlarged scale of the siphon.

Figure 4 is a sectional detail showing more particularly the steam coil for heating the water.

Figure 5 is a section on line 5—5 of Figure 2.

Figure 6 is a top plan view, partly broken away of the siphon.

Similar numerals indicate corresponding parts.

Referring to the drawing:—

1 designates the outer shell of a hot water urn embodying my invention. 2 is the water jacket, and the water is heated by a steam coil 3 in the conventional manner. A cover 4 is provided with a safety valve 5.

The urn is provided with a water gauge 6 and a valve controlled water connection 7.

The siphon is provided with legs 8 within the water jacket and these legs are opened at their lower ends and terminate a desired distance above the bottom of the water jacket. The legs 8 at their upper ends communicate with a vacuum chamber 9 in a casing 10 having an opening 11 in its top wall which serves as a vacuum breaker.

The casing 10 is supported by a pipe 12 communicating with the vacuum chamber 9 and leading through the side wall of the urn to a draw-off faucet 13. 14 designates the space above the hot water.

The operation will now be apparent to those skilled in this art and is as follows:

Assuming that the water in the urn is heated to the desired degree and the attendant desires to draw off hot water for making coffee in a coffee urn, he opens the draw-off faucet 13. The pressure on the hot water in the space 14 will cause the hot water to flow through the siphon legs 8, vacuum chamber and pipe 12 to the draw-off faucet.

If the water is not hot, the opening 11 will cause the vacuum to be broken in the vacuum chamber 9 and water will not flow from the urn to the draw-off faucet.

The opening 11 which causes the vacuum to be broken in vacuum chamber 9 is small compared to the discharge opening of the faucet 13. When the water is heated to obtain a certain amount of pressure in the device the opening of the faucet 13 relieves the pressure built up by steam passing through the opening 11 faster than it can built up, accordingly the pressure in chamber 9 is less than in boiler 2. The pressure in boiler 2 then forces water up the tubes 8 into the chamber 9 from whence it flows to the faucet 13. When the water is cold, or when the pressure is not great enough to force the water into chamber 9, no water is discharged. At these times opening 11 serves to prevent a syphoning action of the water due to the presence of a certain amount of water left in the pipe 12 from the previous drawing.

It will thus be apparent that the attendant cannot obtain cold water from the hot water urn but only hot water heated to the proper degree for making coffee of a standard excellence.

A hotel or restaurant is enabled with this invention to maintain a standard of excellence at all times for their coffee, since coffee of a standard grade is used, and the water must be properly heated in the hot water urn before it can be transferred to the coffee urn.

Having thus described my invention, what I claim as new and desire to secure by Letters Patent is:—

1. In a hot water urn, a water tank, a draw-off faucet, and a siphon within the tank leading to said draw-off faucet and having a vacuum chamber provided with vacuum breaking means of less area than that of the discharge opening of the faucet and effective when the heat of the water is below a predetermined temperature.

2. In a hot water urn, a water tank, a draw-off faucet, a siphon having a leg extending into the water and open at its lower end, and having a vacuum chamber with which the upper end of said leg communicates, said chamber having an opening therein smaller than the discharge opening of the faucet and serving to break the vacuum when the pressure above the water drops to a predetermined degree, and thereby preventing withdrawal of water from the tank when the water is cold.

3. In a hot water urn, a water tank, a draw-off faucet, a pipe leading to said draw-off faucet and extending upwardly in the tank, a vacuum casing forming a vacuum chamber communicating with the upper end of said pipe and having an opening communicating with a space above the water in the tank, and smaller than the discharge opening of the faucet and siphon members communicating with said vacuum chamber and extending into the water in the tank.

RALPH SICA.